Patented Aug. 26, 1952

2,608,541

UNITED STATES PATENT OFFICE 2,608,541

METHOD OF INCORPORATING ROSIN ACID IN POLYMERIC MATERIALS

James E. Troyan and Lawrence R. Sperberg, Phillips, Tex., assignors to Phillips Petroleum Company, a corporation of Delaware No Drawing. Application December 28, 1948, Serial No. 67,762

7 Claims. (Cl. 260—27)

This invention relates to the production of polymeric materials of high molecular weight by emulsion polymerization. This invention also relates to the production of improved elastomers by emulsion polymerization at low temperature.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures. Since conversion rates generally decrease rapidly as the temperature is decreased, faster recipes are necessary in order that these reactions may be carried out on a practical basis. In order to accomplish the desired results at lower temperatures, a number of polymerization recipes have been provided. Outstanding among these are those in which a peroxide or hydroperoxide is a key component, and those in which a diazothioether is a key component. The peroxides and hydroperoxides are usually used in redox recipes, which include a combination of an oxidant, a reductant, and an oxidation catalyst. In this type of recipe the peroxide or hydroperoxide is the oxidant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient oridinarily present is a reductant, and is usually an organic material such as a reducing sugar or other easily oxidizable polyhydroxy compound. Compounds frequently employed in this capacity are glucose, levulose, sorbose, invert sugar, and the like. As the oxidant in such a recipe, there may be used an inorganic peroxide, such as hydrogen peroxide, a pernitrate, a persulfate, a permanganate, or the like, or an organic peroxide such as benzoyl peroxide, or an organic hydroperoxide such as tertiary butyl hydroperoxide, methyl cyclohexyl hydroperoxide, or cumene hydroperoxide. In another type of recipe a diazothioether is the key component, and while it may be used alone, it is preferably used in combination with a water-soluble ferricyanide which is a salt of a monovalent cation, such as ammonium or an alkali metal. In all of these recipes, it is usually desirable to include a modifier, such as a mercaptan, an emulsifying agent such as a soap, or other known emulsifying agents, and various other ingredients which improve the qualities of the resulting latex or of the final rubber product.

These emulsion polymerization recipes of various types are applicable over a broad range of conditions. Numerous variations have been introduced in the interest of obtaining materials of varied properties and wide adaptability. Some of the more recent developments have revealed that materials prepared by low temperature emulsion polymerization methods, such as at 0° C. and below, are to be preferred to those produced at higher temperatures, such as around 40 to 50° C. It is also recognized that polymeric synthetic rubber products containing rosin acids are preferable in many instances to those containing fatty acids. In fact, fatty acids are known to produce deleterious effects when present in the synthetic rubber polymer in appreciable amounts. For example, fatty acids impart poor aging properties to the polymer. When fatty acid soaps are employed as emulsifying agents in polymerization reactions, the polymer usually contains fatty acids upon coagulation of the latex. Likewise in instances where rosin soaps are employed as emulsifiers, rosin acids will remain in the final product. While rosin acids are generally considered desirable in the finished product, difficulties have been encountered when using rosin soaps as emulsifiers for polymerization reactions which are carried out at temperatures below 0° C., particularly a markedly slow reaction rate, and sometimes gel-formation.

We have now found a method whereby emulsion polymerization reactions may be carried out to yield synthetic polymer products containing rosin acids but substantially free from fatty acids, or containing only minor quantities thereof. The method comprises carrying out the polymerization in the presence of an emulsifying agent of such nature that there will be no fatty acid in the polymer, or at least the amount will be substantially reduced, and incorporating a rosin acid compound, such as rosin acid soap or a rosin acid, into the latex subsequent to polymerization but prior to coagulation of the latex. Coagulation with an acidic coagulant material is then effected and rosin acid remains in the product. Preferably the reaction is shortstopped prior to the addition of the rosin acid compound. This shortstopping is done when about 50 to about 85 per cent of the initial polymeric material has been reacted. In such a case, unreacted monomeric material is preferably removed, as by distillation, immediately after shortstopping and before addition of the rosin acid compound.

Subsequent to the addition of the rosin acid compound the latex is coagulated with an acid, as in conventional operations. The method of coagulation of latex which is preferred is that currently in general use, known as the brine-acid method. This comprises creaming the latex by the addition of a strong solution of a salt, such as sodium chloride, and then adding an acid to effect coagulation. Any one of a variety of acids may be used for coagulation, such as the more readily available nonoxidizing mineral acids and organic acids of low molecular weight; dilute sulfuric acid is generally preferred. The addition of such an acid not only effects a coagulation of the latex but also a simultaneous conversion of soap to free acid. It is for this reason that, when a soap of a fatty acid, such as sodium oleate or potassium laurate, is used as emulsifying agent the final polymer product contains the corresponding fatty acid. However, we have found that when an emulsifier is used such as one of those discussed herein as being preferred, and a soap of a rosin acid is added between polymerization and coagulation, no undesirable residue of such emulsifying agent is present in the final polymer product and, at the same time, a corresponding rosin acid is present, intimately incorporated, in this polymer product. The addition of a soap of a rosin acid does not upset the stability of the latex, so that uniform mixing is obtained. A rosin acid may sometimes be added directly, but usually is not as desirable since a premature, or localized, coagulation may result with attendant difficulties including nonuniform mixing.

The process of the present invention affords the advantages realized from having a rosin acid in the final product as well as the advantages attendant in low temperature polymerizations. Polymerization is effected at rapid rates, even at low temperatures, to give products which are characterized particularly by their excellent retention of tensiles and extensibilities at elevated temperatures and their exceptionally good hysteresis-flex life balance. The presence of rosin acid in the polymer further enhances these properties, noteworthy improvements being observed especially in flex life and tack.

An object of this invention is to produce an improved synthetic rubber. Another object of this invention is to produce a synthetic rubber in which a rosin acid is intimately incorporated. A further object of this invention is to produce polymeric materials at low polymerization temperatures. Still another object of our invention is to produce a synthetic rubber having improved qualities as to one or more of the properties of tack, flex life, and abrasion resistance. Further objects and advantages of our invention will become apparent, to one skilled in the art, from the accompanying disclosure and discussion.

Since certain difficulties are involved when using rosin soaps as emulsifiers during the polymerization reaction, particularly in low temperature polymerizations, we have found that it is highly desirable to employ other types of emulsifiers and incorporate the rosin acid compound into the recipe subsequent to polymerization. Usually the rosin acid compound is a soap of an alkali metal, added as an aqueous solution. At times a rosin acid may be used directly, preferably dissolved in an organic solvent, such as carbon tetrachloride or benzene. In view of the fact that fatty acids impart poor aging characteristics to synthetic rubber while rosin acids produce desirable effects, it is highly advantageous to produce a material substantially free from fatty acids but containing rosin acids. These results are readily accomplished according to the method of this invention by employing emulsifying agents which remain in the aqueous phase upon coagulation of the latex.

One of the important features of the preferred embodiment of this invention lies in the incorporation of rosin soap into the latex prior to coagulation. When this method is employed the rosin soap is easily blended into the mixture to produce an intimate dispersion of rosin acid in the final product. On the contrary, when attempts are made to incorporate rosin acid into the rubber on the mill, certain difficulties arise and proper dispersion is difficult to attain.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2 - chloro - 1,3 - butadiene), bromoprene, methyl chloroprene (2-chloro-3-methyl-1,3-butadiene), and the like; aryl olefins such as styrene, various alkyl styrenes, p-chloro styrene, p-methoxy styrene, alpha-methyl styrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerzation may be conducted in batches, semicontinuously, or continuously. The total pressure on the reactants is preferably at least as great as the total vapor pressure of the mixture, so that the initial reactants will be present in liquid phase.

The rosin soaps which are used in this invention are prepared from rosin acids by treatment with a metal hydroxide such as sodium hydroxide, potassium hydroxide, and the like. The rosin acids may be obtained from any source, such as from wood rosin, and may be used as such or treated in various ways to effect purification. The disproportionated rosin acids, i. e., rosin acids treated in such a way that selective dehydrogenation and hydrogenation occur, are particularly effective. Specific examples of rosin acids which can be used include abietic acid, and dehydro-, dihydro-, and tetrahydro-abietic acids.

Emulsifying agents which are preferred for carrying out the process herein described are those which remain in the aqueous phase when coagulation is effected. Materials such as alkali metal alkyl sulfates and sulfonates, sulfated and sulfonated succinic esters, salts of alkyl aromatic sulfonates, and the like, may be employed. Specific examples of these materials are sodium and potassium alkyl benzene sulfonates, alkyl toluene sulfonates, and alkyl naphthalene sulfonates, having about fifteen to about thirty carbon atoms per molecule, sodium lorol sulfate, etc. Nonionic emulsifiers are also applicable, and compounds illustrative of this class of materials are the aralkyl polyether alcohols, and condensation products of alkyl phenols with ethylene oxide. Mixtures of emulsifying agents may also be employed if desired. For example, mixtures of sulfated and sulfonated aliphatic or aromatic compounds may be used, as well as mixtures of fatty acid emulsifiers with these materials. In the latter case the amount of fatty acid emulsifier is generally kept lower than about five parts per 100 parts of monomers charged, this amount being what is ordinarily employed in emulsion polymerization recipes, in order that only a minor amount of fatty acid will remain in the finished product.

Various polymerization recipes are applicable in the practice of our invention, including those of the redox type, i. e., recipes in which selected combinations of oxidizing and reducing agents are employed, diazo thioetherferricyanide-mercaptan-alcohol recipes, and organic hydroperoxide recipes; the latter two are most frequently preferred when carrying out polymerization reactions according to the present process. In the latter case, polymerizations affected in the presence or absence of an organic reducing agent, such as a reducing sugar or other easily oxidizable polyhydroxy compound, give satisfactory results.

The amount of rosin soap, or rosin acid, incorporated into the latex may range from one to ten parts per 100 parts of monomers charged, with the amount usually being in excess of two parts.

As hereinbefore stated the present invention is concerned with the production of rosin acid-containing polymers prepared by low temperature processes. The operating temperature may range from —30 or lower to 0° C., or higher.

Advantages of this invention are illustrated by the following examples. The reactants, and their proportions, and the other specific ingredients of the recipes are presented as being typical and should not be construed to limit the invention unduly.

*Example I*

In order to demonstrate the superiority of synthetic rubber containing rosin acid over rubber containing fatty acid only, particularly as regards aging characteristics, the preparation of polymers is effected using a diazo thioetherferricyanide-mercaptan recipe but employing a fatty acid emulsifier in one case and an alkyltoluene sulfonate in the other. Significant improvements are realized in flex-life, tack, tensile strength, and elongation. The recipe is as follows:

| | Parts by weight |
|---|---|
| Butadiene | 70 |
| Styrene | 30 |
| Water | 200 |
| Methanol | 50 |
| Emulsifier | 5.0 |
| 2 - (4 - Methoxybenzene diazomercapto) naphthalene | 0.4 |
| Potassium ferricyanide | 0.3 |
| Potassium hydroxide | 0.1 |
| Trisodium phosphate | 0.5 |
| Mercaptan blend [1] | 0.2 |

[1] A blend of tertiary $C_{12}$, $C_{14}$, and $C_{16}$ aliphatic mercaptans in a ratio of 3 : 1 : 1 parts by weight.

In the charging procedure 0.2 part of the potassium ferricyanide and 0.1 part of the mercaptan are blended initially. The remainder of the materials are charged in two increments of 0.05 part each at intervals of 9 and 18 hours, respectively. Polymerization is effected in the conventional manner at —10° C., after which the reaction is shortstopped with a mixture of 0.1 part hydroquinone and 0.2 part ditertiary butyl hydroquinone, and stabilization effected with 2 per cent phenyl-beta-naphthylamine. The reaction is allowed to continue to 60 per cent conversion.

In the first polymerization run, potassium oleate is employed as the emulsifier. Subsequent to polymerization, shortstopping, and stabilization, the latex is coagulated by the brine-acid method. When operating in this manner the polymer contains 6.7 per cent fatty acid.

In the second polymerization run the emulsifier employed is sodium alkyltoluene sulfonate, prepared by the alkylation of benzene with olefins boiling at 350–450° F. followed by sulfonation and neutralization. As in the first run, the reaction is allowed to continue to 60 per cent conversion. The latex is divided into two equal portions and rosin soap added to each portion in such amounts that in the first case the polymer will contain 1.0 part rosin acid per 100 parts polymer and in the second case the amount of rosin acid present will be 5.0 parts. Coagulation is effected by the brine-acid method.

The polymer samples are compounded according to the following recipes:

|  | Fatty Acid Sample, Parts by Weight | Rosin Acid Samples, Parts by Weight |
|---|---|---|
| Polymer | 100 | 100 |
| Carbon black [1] | 50 | 50 |
| Zinc oxide | 3 | 3 |
| Asphalt softener | 10 | 10 |
| Sulfur | 1.75 | 1.75 |
| Accelerator [2] | 1.20 | 1.20 |
| Stearic acid |  | 1.8 |

[1] An easy processing channel black.
[2] N-cyclohexyl-2-benzothiazolesulfenamide.

A study of the physical properties of the polymers is made by curing the compounded samples 30 minutes at 307° F. and then making the tests. Data obtained on samples of different acid content as described above are herewith presented. For purposes of comparison evaluation data on a standard GR–S sample are included.

|  | Fatty Acid | Rosin Acid 1.0 Part | Rosin Acid 5.0 Parts | Standard GR–S (Control) |
|---|---|---|---|---|
| Unaged Samples— |  |  |  |  |
| Stress-strain properties, 80° F.: |  |  |  |  |
| Tensile (p. s. i.) | 4,320 | 4,640 | 4,360 | 3,380 |
| Elongation (percent) | 650 | 680 | 780 | 620 |
| Stress-strain properties, 200° F.: |  |  |  |  |
| Tensile (p. s. i.) | 1,470 | 1,880 | 2,130 | 1,110 |
| Elongation (percent) | 340 | 445 | 520 | 275 |
| Hysteresis, ΔT, °F | 62.5 | 70.2 | 80.0 | 77.3 |
| Resilience, percent | 65.7 | 66.3 | 63.9 | 57.0 |
| Flex-life, thousands of flexures to failure | 9.1 | 22.0 | 34.5 | 4.5 |
| Oven-aged 24 hours at 212° F.— |  |  |  |  |
| Stress-strain properties, 80° F.: |  |  |  |  |
| Tensile (p. s. i.) | 3,400 | 3,900 | 4,400 | 2,600 |
| Elongation (percent) | 450 | 460 | 565 | 360 |
| Hysteresis, ΔT, °F | 60.0 | 61.4 | 60.7 | 62.0 |
| Resilience, percent | 69.3 | 70.0 | 69.3 | 65.1 |
| Flex-life, thousands of flexures to failure | 2.5 | 7.0 | 12.1 | 3.8 |

The polymer samples containing rosin acid show better oven-aged characteristics. The evaluation data also show improvements in flex-life with an increase in rosin acid content and also better tack, tensile strength, and elongation.

Example II

A butadiene-styrene copolymer was prepared by emulsion polymerization at −10° C. using the following recipe:

| | Parts by weight |
|---|---|
| Butadiene | 70 |
| Styrene | 30 |
| Water | 200 |
| Methanol | 50 |
| Sodium alkyl toluene sulfonate (with potassium hydroxide added to establish pH of emulsifier at 11.8) | 5.0 |
| Potassium ferricyanide | 0.3 |
| 2 - (4 - methoxybenzene diazomercapto) naphthalene | 0.3 |
| Mercaptan blend [1] | 0.4 |

[1] A blend of tertiary $C_{12}$, $C_{14}$, and $C_{16}$ mercaptans in a ratio of 3 : 1 : 1 parts by weight.

A conversion of 57.5 per cent was attained in a 21-hour reaction period.

When 5.0 parts rosin soap are incorporated into the short-stopped latex, the mixture coagulated by the brine-acid method, and the resulting polymer compounded and tested according to the procedure given in Example I, comparable results are obtained.

Example III

The copolymerization of butadiene and styrene was carried out according to the following recipe:

| | Parts by weight |
|---|---|
| Butadiene | 70 |
| Styrene | 30 |
| Water | 200 |
| Methanol | 50 |
| Sodium alkyl toluene sulfonate | 5.0 |
| 2 - (4 - methoxybenzene diazomercapto) naphthalene | 0.3 |
| Potassium ferricyanide | 0.3 |
| n-$C_{16}$ mercaptan | 1.0 |
| Mercaptan blend [1] | 0.18 |

[1] See Example II.

The pH of the emulsifier was adjusted to 11.0 by the addition of potassium hydroxide. Polymerization was carried out at −10° C. in the conventional manner to give a 57 per cent conversion in 16.7 hours.

Addition of rosin soap to the short-stopped latex, coagulation, compounding, and testing as in Example I gives results similar to those hereinbefore reported.

Example IV

The recipe of Example III was followed except that a mixture of equal parts of sodium alkyl toluene sulfonate and potassium laurate was used as the emulsifier. The conversion in 16.7 hours was 62 per cent. The incorporation of rosin soap into the latex as given in Example I, followed by similar coagulation, compounding, and testing, gives results comparable to those previously obtained.

Example V

The following cumene hydroperoxide recipe was employed for the preparation of a butadiene-styrene copolymer:

| | Parts by weight |
|---|---|
| Butadiene | 70 |
| Styrene | 30 |
| Water | 136 |
| Methanol | 30 |
| Cumene hydroperoxide | 0.19 |
| Emulsifier [1] (pH 9.5) | 5.0 |
| Mercaptan blend [2] | 0.25 |
| Sodium sulfate | 0.20 |
| Activator solution [3] | 14.0 |

[1] The emulsifier comprised a 75/25 mixture of fatty acid soaps with sodium alkyl toluene sulfonate. The fatty acid soap contained a mixture of equal parts of potassium laurate with potassium myristate.
[2] See Example II.
[3] The activator solution contained 5.0 g. of $$Na_4P_2O_7 \cdot 10H_2O$$

and 2.22 g. $FeSO_4 \cdot 7H_2O$ in 100 ml. of aqueous solution heated at 60° C. for 40 minutes.

Polymerization was effected at −10° C. using the conventional technique. At the end of a 16-hour reaction period the conversion had reached 72 per cent. The reaction was then stopped by addition of a short-stop agent, and a rosin soap was added prior to coagulation with an acid coagulant.

The resulting rosin acid containing product shows results comparable to those given in Example I when compounded and tested in the same manner.

*Example VI*

Prior to introduction of rosin soap, a butadiene-styrene latex was prepared according to the recipe of Example V except that sodium di-secondary-butyl naphthalene sulfonate was used as the emulsifier in place of sodium alkyl toluene sulfonate and the pH of the emulsifier mixture was 9.4. A conversion of 69.0 per cent was reached in 16.4 hours. Comparable results are obtained when an alkyl polyether alcohol (known as Triton N-100) is employed in place of the sodium di-secondary butyl naphthalene sulfonate.

*Example VII*

Polymerization was effected according to the following recipe:

| | Parts by weight |
|---|---|
| Butadiene | 70 |
| Styrene | 30 |
| Mercaptan blend [1] | 0.25 |
| Emulsifier [2] | 5.0 |
| Total water, including that in the activator composition | 126 |
| Glycerin | 54 |
| Cumene hydroperoxide | 0.18 |
| Activator composition [3] | 14 |

[1] See Example II.
[2] The emulsifier was a sodium alkyl benzene sulfonate prepared by the alkylation of benzene with olefins boiling at 350–450° F. followed by sulfonation and neutralization. The pH was 11.0.
[3] See Example V.

Polymerization carried out at −10° C. for a 15-hour period gave a conversion at 70 per cent, at which point the reaction is stopped.

The same procedure was followed except that sodium alkyl toluene sulfonate, prepared from toluene and olefins boiling at 375–475° F. was used as the emulsifying agent. A 61 per cent conversion was obtained at the end of 15 hours.

When polymers containing rosin acid are prepared and tested in the manner described in Example I, similar properties are exhibited.

*Example VIII*

In order to demonstrate improvements in flex life, tack, and abrasion resistance, a butadiene-styrene copolymer was prepared according to the recipe of Example V except that the emulsifier employed was 5.0 parts potassium laurate, and 0.4 part potassium chloride was added instead of sodium sulfate. Polymerization was effected at −10° C. for a period of 20.3 hours and at the end of this time a conversion of 60 per cent had been reached. The short-stopped latex was divided into two parts. The first part was coagulated by the brine-acid method and contained 3.5 parts fatty acid. To the second portion rosin soap was added prior to coagulation in such amount that the polymer contained 3.5 parts rosin acid in addition to the 3.5 parts fatty acid already present. (These amounts of acid are stated in terms of 100 parts monomers.) The samples were compounded according to the following recipe:

| | Parts by weight |
|---|---|
| Polymer | 100 |
| Carbon black [1] | 50 |
| Zinc oxide | 3 |
| Asphalt softener | 10 |
| Sulfur | 1.75 |
| Accelerator [2] | 0.8 |

[1] See Example I.
[2] See Example I.

The samples were cured at 307° F. and physical tests made at 210° F. Data are tabulated on the two samples as follows: The polymers were easy milling and smooth.

| Sample | 3.5 Parts Fatty Acid Only | 3.5 Parts Fatty Acid, 3.5 Parts Rosin Acid |
|---|---|---|
| Flex life: | | |
| 30 minutes cure | 10.8 | 28.6 |
| 45 minutes cure | 5.1 | 8.9 |
| Flex life on sample oven-aged 24 hours at 212° F.: | | |
| 30 minutes cure | 1.2 | 2.6 |
| 45 minutes cure | 1.9 | 2.5 |
| Abrasion loss: 45 minutes cure | 2.96 | 2.53 |
| Abrasion loss on sample oven-aged 24 hours at 212° F. | 3.87 | 3.34 |
| Tack [1] | 2 | 5 |

[1] Tack is rated on an arbitrary scale, higher numbers indicating improved tack.

In the preceding examples the sodium alkyl toluene sulfonate used as emulsifying agent correspond approximately to the formula $$C_{12}H_{25}.C_6H_3(CH_3)SO_3Na$$

As will be evident to those skilled in the art, various modifications of this invention can be made, or followed, in the light of the foregoing disclosure and discussion, without departing from the spirit or scope of the disclosure or from the scope of the claims.

We claim:

1. An improved process for the production of synthetic rubber by copolymerizing a monomeric material comprising a major amount of 1,3-butadiene and a minor amount of styrene while dispersed in an aqueous emulsion, which comprises conducting said polymerization at a polymerization temperature between −30 and 0° C. and in the presence of an alkali metal alkyl benzene sulfonate as the emulsifying agent, adding a short-stop agent to stop said polymerization short of complete conversion, admixing with resulting latex a rosin acid soap of an alkali metal in an amount between 1 and 10 parts by weight per 100 parts by weight of said original monomeric material, adding an acidic coagulant to said latex, whereby dispersed polymer in said latex is coagulated and said rosin acid soap is converted to a rosin acid which is intimately incorporated in the coagulated polymer, and recovering a resulting rosin acid-containing polymeric material so produced.

2. An improved process for the production of synthetic rubber by copolymerizing a monomeric material comprising a major amount of 1,3-butadiene and a minor amount of styrene while dispersed in an aqueous emulsion, which comprises effecting said polymerization at a polymerization temperature between −30 and 0° C. and with an alkaline aqueous medium and utilizing an emulsifying agent during said polymerization which will remain dissolved in said aqueous medium after addition of an acidic coagulant, adding to a resulting latex after a desired polymerization is effected a rosin acid compound selected from the group consisting of free rosin acids and alkali metal salts of rosin acids in an amount between 1 and 10 parts by weight per 100 parts of said monomeric material, subsequently adding to said latex an acidic coagulant, and recovering a resulting rosin acid-containing polymeric material so produced.

3. An improved process for the production of synthetic rubber by copolymerizing a monomeric material comprising 1,3-butadiene while dispersed in an aqueous emulsion, which comprises effecting said polymerization at a polymerization temperature between $-30$ and $0°$ C. and with an alkaline aqueous medium and utilizing an emulsifying agent during said polymerization which will remain dissolved in said aqueous medium after addition of an acidic coagulant, adding to a resulting latex after a desired polymerization is effected a rosin acid compound selected from the group consisting of free rosin acids and alkali metal salts of rosin acids in an amount between 1 and 10 parts by weight per 100 parts of said monomeric material, subsequently adding to said latex an acidic coagulant, and recovering a resulting rosin acid-containing polymeric material so produced.

4. An improved process for the production of synthetic rubber by copolymerizing a monomeric material comprising a conjugated diolefin while dispersed in an aqueous emulsion, which comprises effecting said polymerization at a polymerization temperature between $-30$ and $0°$ C. and with an alkaline aqueous medium and utilizing an emulsifying agent during said polymerization which will remain dissolved in said aqueous medium after addition of an acidic coagulant, adding to a resulting latex after a desired polymerization is effected a rosin acid compound selected from the group consisting of free rosin acids and alkali metal salts of rosin acids in an amount between 1 and 10 parts by weight per 100 parts of said monomeric material, subsequently adding to said latex an acidic coagulant, and recovering a resulting rosin acid-containing polymeric material so produced.

5. In the production of a synthetic rubber by copolymerization of a monomeric material comprising 65 to 90 per cent by weight 1,3-butadiene and the remainder styrene in aqueous emulsion, the improvement which comprises effecting said polymerization at a temperature between $-30$ and $0°$ C. in the presence of a sodium alkyl toluene sulfonate having fifteen to thirty carbon atoms per molecule as emulsifying agent, stopping said polymerization when between 50 and 85 per cent of said monomeric material is polymerized, removing unreacted monomeric material, adding to the resulting latex a sodium salt of a disproportionated rosin acid in an amount between 2 and 10 parts by weight per 100 parts of original monomeric material, subsequently admixing an acidic coagulant and coagulating said latex, and recovering a resulting crude synthetic rubber containing a disproportionated rosin acid dispersed therein.

6. A process for the production of synthetic rubber by copolymerizing a monomeric material comprising 1,3-butadiene while dispersed in an aqueous medium, which comprises conducting said polymerization at a polymerization temperature between $-30$ and $0°$ C. in the presence of an emulsifier consisting of a sodium alkyl toluene sulfonate having fifteen to thirty carbon atoms per molecule, stopping said polymerization when between 50 and 85 per cent of said monomeric material is polymerized, removing unreacted monomeric material, adding to the resulting latex a sodium salt of a disproportionated rosin acid in an amount between 2 and 10 parts by weight per 100 parts of original monomeric material, subsequently admixing an acidic coagulant and coagulating said latex, and recovering a resulting crude synthetic rubber containing a disproportionated rosin acid dispersed therein.

7. An improved process for the production of synthetic rubber by copolymerizing a monomeric material comprising a conjugated diolefin while dispersed in an aqueous emulsion, which comprises effecting said polymerization at a polymerization temperature between $-30$ and $0°$ C. and with an alkaline aqueous medium and utilizing an emulsifying agent during said polymerization which will remain dissolved in said aqueous medium after addition of an acidic coagulant, stopping said polymerization when between 50 and 85 per cent of said monomeric material is polymerized, removing unreacted monomeric material from a resulting latex, admixing with said monomer-free resulting latex a rosin acid compound selected from the group consisting of free rosin acids and alkali metal salts of rosin acids in an amount between 1 and 10 parts by weight per 100 parts of original monomeric material, subsequently admixing with said latex an acidic coagulant and coagulating said latex, and recovering a resulting crude synthetic rubber containing a rosin acid dispersed therein.

JAMES E. TROYAN.
LAWRENCE R. SPERBERG.

REFERENCES CITED

The following references are of record in the file of this patent:

UNITED STATES PATENTS

| Number | Name | Date |
|---|---|---|
| 1,739,566 | Ali-Cohen | Dec. 17, 1929 |
| 1,938,731 | Tschunker et al. | Dec. 12, 1933 |
| 2,317,385 | Koch et al. | Apr. 27, 1943 |
| 2,327,975 | Zaucker | Aug. 24, 1943 |
| 2,335,124 | Konrad et al. | Nov. 23, 1943 |
| 2,397,201 | Pfau | Mar. 26, 1946 |
| 2,419,512 | Vesce | Apr. 22, 1947 |
| 2,393,261 | Peaker | Jan. 22, 1948 |
| 2,446,107 | Rumbold | July 27, 1948 |
| 2,486,183 | Long et al. | Oct. 25, 1949 |

FOREIGN PATENTS

| Number | Country | Date |
|---|---|---|
| 566,138 | Great Britain | Dec. 15, 1944 |
| 601,223 | Great Britain | Apr. 30, 1948 |

OTHER REFERENCES

Ser. No. 371,464, Zerbe et al. (A. P. C.), published Apr. 20, 1943.

Winkelmann, India Rubber World, Aug. 1946, page 680.

Semon, Chem. and Eng. News, vol. 24, No. 21, Nov. 10, 1946, pp. 2900 to 2905.